United States Patent
Henne et al.

(10) Patent No.: US 8,145,512 B1
(45) Date of Patent: Mar. 27, 2012

(54) DATA MINING OF USER ACTIVITY DATA TO IDENTIFY SEQUENTIAL ITEM ACQUISITION PATTERNS

(75) Inventors: Randal M. Henne, Seattle, WA (US); Dwayne S. Benefield, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 2552 days.

(21) Appl. No.: 10/945,547

(22) Filed: Sep. 20, 2004

Related U.S. Application Data

(63) Continuation-in-part of application No. 10/864,288, filed on Jun. 9, 2004.

(51) Int. Cl.
*G06Q 10/00* (2012.01)

(52) U.S. Cl. .................................. 705/7.11

(58) Field of Classification Search .......... 128/710; 705/26, 26.1; 707/102
See application file for complete search history.

(56) References Cited

U.S. PATENT DOCUMENTS

| | | | |
|---|---|---|---|
| 4,346,718 A * | 8/1982 | Morris | 600/523 |
| 5,909,023 A | 6/1999 | Ono et al. | |
| 6,460,036 B1 | 10/2002 | Herz | |
| 6,691,163 B1 | 2/2004 | Tufts | |
| 6,782,370 B1 | 8/2004 | Stack | |
| 6,839,680 B1 | 1/2005 | Liu et al. | |
| 6,963,850 B1 * | 11/2005 | Bezos et al. | 705/26 |
| 7,092,936 B1 | 8/2006 | Alonso et al. | |
| 2002/0019763 A1 | 2/2002 | Linden et al. | |
| 2002/0198882 A1 | 12/2002 | Linden et al. | |
| 2003/0177070 A1 * | 9/2003 | Viswanath et al. | 705/26 |
| 2005/0120045 A1 * | 6/2005 | Klawon | 707/102 |

OTHER PUBLICATIONS

Marketing strategy optimization: Using linear programming to establish an optimal marketing mixture Drew M Stapleton, Joe B Hanna, Dan Markussen. American Business Review. West Haven: Jun. 2003. vol. 21, Iss. 2; p. 54.*

Zaiane, et al., "Discovering Web Access Patterns and Trends by Applying OLAP and Data Mining Technology on Web logs," Proceedings of IEEE International Forum on Research and Technology Advances in Digital Libraries, pp. 19-29, Apr. 22-24, 1998.

R. Agrawal et al, "Quest: a project on database mining," Proceedings of the 1994 ACM SIGMOD International Conference on Management of Data, 1994, p. 514 (ISSN: 0163-5808).

(Continued)

*Primary Examiner* — Romain Jeanty
*Assistant Examiner* — Luis Santiago
(74) *Attorney, Agent, or Firm* — Knobbe, Martens, Olson & Bear LLP

(57) ABSTRACT

A data mining component collectively analyzes item acquisition histories of users of an electronic catalog of items to identify pairs of items that tend to be acquired sequentially. For each such item pair, the data mining component may also determine whether user acquisitions of the two items tend to be spaced apart in time by a characterizing time interval. In addition, the data mining component may calculate one or more conditional probability values reflective of the frequency with which users who acquire the first item in the pair acquire the second item after waiting for a particular interval of time. The item relationship data extracted by the data mining component may be displayed in the electronic catalog in association with corresponding catalog items to assist users in selecting items to acquire, and/or may be used to generate personalized item recommendations.

31 Claims, 7 Drawing Sheets

OTHER PUBLICATIONS

R. Agrawal et al, "Mining association rules between sets of items in large databases," Proceedings of the 1993 ACM SIGMOD International Conference on Management of Data, 1993, pp. 207-216.

M. Gery and H. Haddad, "Evaluation of web usage mining approaches for user's next request prediction," Proceedings of the 5th ACM International Conference on Web information and Data Management, pp. 74-81, 2003 (ISBN: 1-58113-725-7).

R. Srikant and R. Agrawal, "Mining Sequential Patterns: Generalizations and Performance Improvements," Proceedings of the 5th International Conference on Extending Database Technology, pp. 3-17, 1996 (ISBN: 3-540-61057-X).

Schafer et al., "E-Commerce Recommendation Applications," Data Mining and Knowledge Discovery, vol. 5, Nos. 1-2, Jan. 2001, pp. 115-153.

* cited by examiner

DATA MINING OF USER ACTIVITY DATA TO IDENTIFY SEQUENTIAL ITEM ACQUISITION PATTERNS

RELATED APPLICATIONS

This application is a continuation-in-part of U.S. application Ser. No. 10/864,288, filed Jun. 9, 2004.

FIELD OF THE INVENTION

The present invention relates to data mining algorithms for analyzing item acquisition histories of users of an electronic catalog of items.

BACKGROUND OF THE INVENTION

A variety of technologies exist for collecting and mining user activity data reflective of the actions and preferences of users of an electronic catalog. For example, it is known in the art to collectively analyze the activity data of a population of users to identify items that tend to be viewed, purchased, or otherwise selected in combination. Different types of item relationships may be detected by applying different similarity algorithms and metrics to the activity data. For instance, a pair of items, A and B, may be identified as likely substitutes on the basis that a relatively large number of the users who view A also view B during the same browsing session. Items C and D, on the other hand, may be identified as complementary because a relatively large number of those who purchase C also purchase D.

The item relationships extracted from the user activity data may be exposed to users of the electronic catalog to assist users in identifying items of interest. For example, in some systems, when a user views a catalog item, the user is informed of other items that are commonly viewed (or purchased) by those who have viewed (or purchased) the item. Although this type of data is helpful, users could benefit from knowing more about the relationships that exist between specific items.

SUMMARY OF THE INVENTION

The present invention comprises data mining methods for analyzing user activity data associated with an electronic catalog of items to generate various types of item relationship data. The item relationship data may be presented in the electronic catalog to assisting users in making informed item selection decisions, and/or may be used to recommend specific items to users. The invention may be embodied within any type of electronic catalog system (web site, online services network, multi-site "mall" system, etc.) in which users can select catalog items to purchase, rent, download, or otherwise acquire.

In one embodiment, a data mining component collectively analyzes item acquisition histories of users of an electronic catalog of items to identify pairs of items that tend to be acquired sequentially. The data mining component may also determine, for each such item pair, whether user acquisitions of the two items tend to be spaced apart in time by a characterizing time interval. In addition, the data mining component may calculate one or more conditional probability values reflective of the frequencies with which users who acquire the first item in the pair acquire the second item after waiting for a particular interval of time.

The item relationship data extracted by the data mining component may be used to supplement item detail pages, or other pages of the electronic catalog, with information that assists users in selecting items to acquire. For instance, the detail page for a particular item, item A, may be supplemented with a list of other items that are frequently purchased a particular amount or interval of time, such as three to five months, after acquiring item A. This list may also include associated conditional probability values, which may be expressed as percentages. For instance, the detail page for item A may indicate that 40% of the users who acquired item A acquired item B five or more months later.

The extracted item relationship data may additionally or alternatively be used to select items to recommend to users at specific points in time. For instance, if it is determined that a relatively large percentage of the users who acquire item C acquire item D approximately five months later, item D may be recommended to users who acquired item C five months ago and have not yet acquired item D. The recommendations may be provided by email, customized web pages, and/or other communications methods.

Neither this summary nor the following detailed description purports to define the invention. The invention is defined by the claims.

DETAILED DESCRIPTION OF SPECIFIC EMBODIMENTS

Specific embodiments of the invention will now be described with reference to the drawings. These embodiments are intended to illustrate, and not limit, the present invention. For example, although the specific embodiments described herein involve the generation and display of data regarding item purchase events, the invention is also applicable to other types of item acquisition actions, including rentals, licenses and downloads of items.

Figure 1:
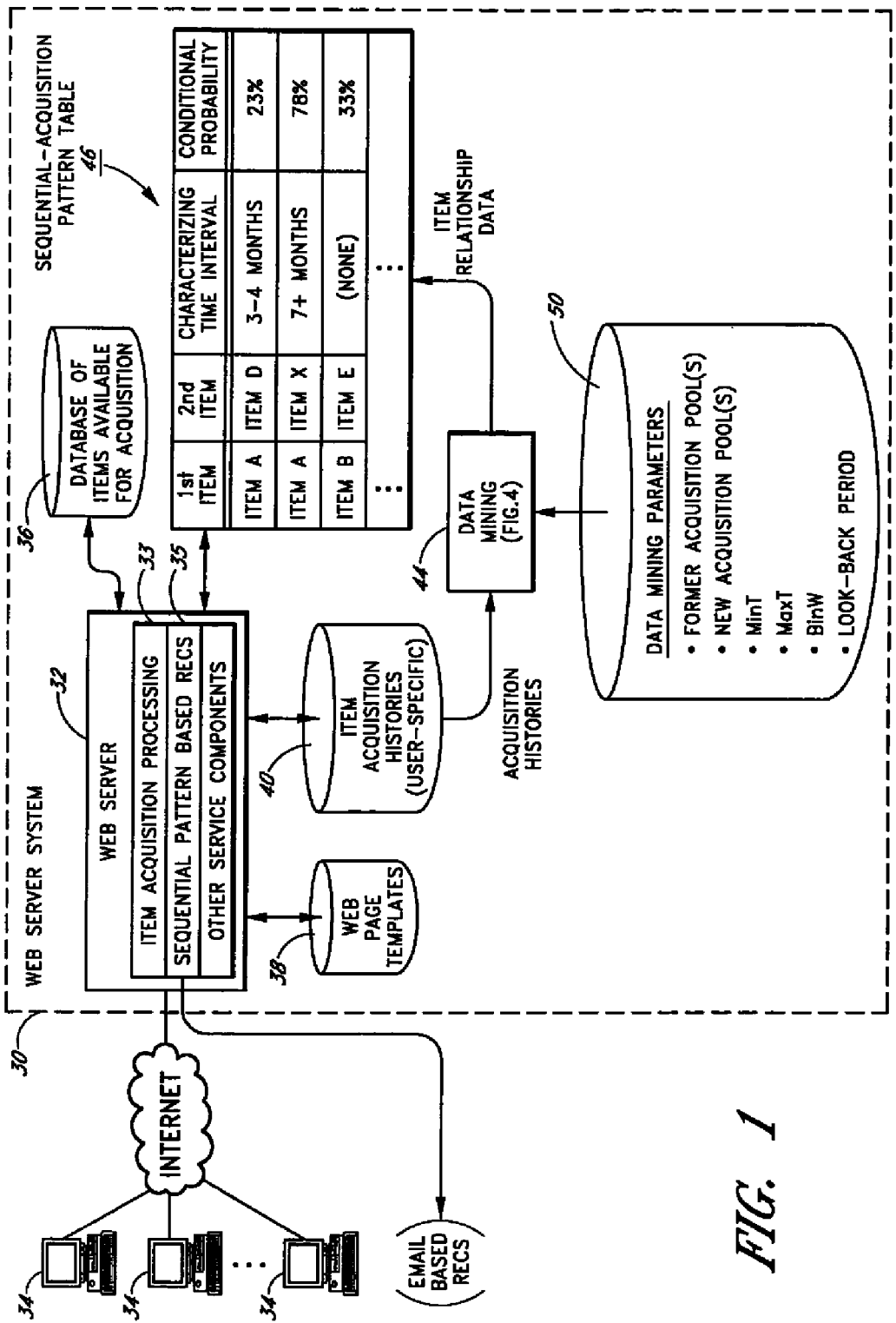
FIG. 1 illustrates a web site system according to one embodiment of the invention.

FIG. 1 illustrates a web server system 30 according to one embodiment of the invention. The web server system 30 includes a web server 32 that generates and serves pages of a host web site to computing devices 34 of end users. Although depicted as desktop computers, the computing devices 34 may include a variety of other types of devices, such as cellular telephones and Personal Digital Assistants (PDAs). The web server 32 may be implemented as a single physical server or a collection of physical servers. The invention may alternatively be embodied in another type of multi-user, interactive system, such as an interactive television system, an online services network, or a telephone-based system in which users select items to acquire via telephone keypad entries and/or voice.

The web server 32 provides user access to an electronic catalog of items represented within database 36 or a collection of databases. An item acquisition processing component 33 that runs on, or in association with, the web server 32 provides functionality for users to place orders for catalog items they wish to acquire. The items represented in the database 36 may include or consist of items that may be purchased, rented, licensed, or otherwise acquired via the web site (e.g., consumer electronics products; household appliances; book, music and video titles in physical or downloadable form; magazine subscriptions, etc.). In one embodiment, the items consist primarily or exclusively of physical products that may be purchased via the web site. Many hundreds of thousands or millions of different items may be represented in the database 36. As is conventional, the items may be arranged within a hierarchy of browse categories to facilitate navigation of the catalog.

Figure 3:
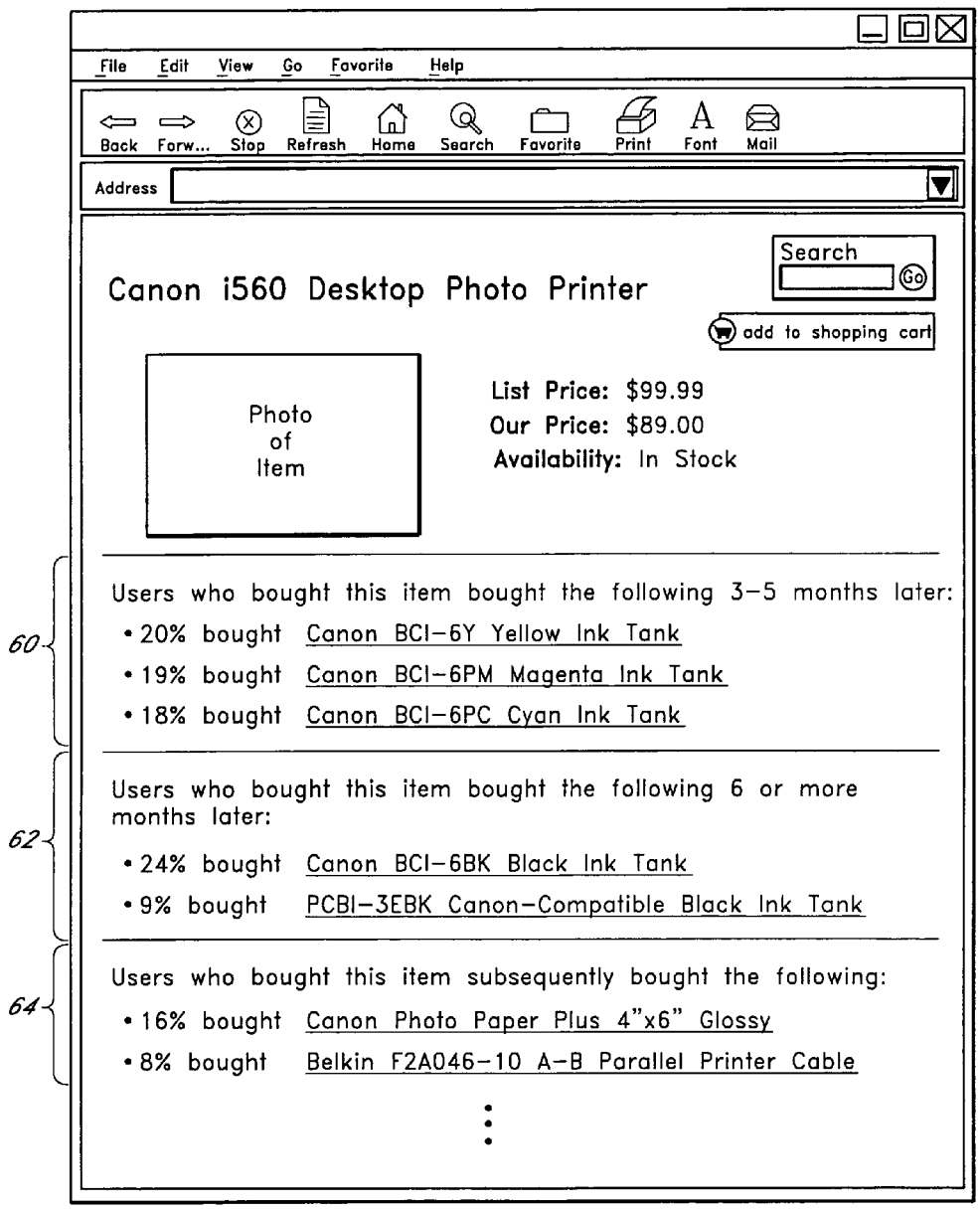
FIG. 3 illustrates one example of an item detail page that may be generated and provided to users to convey additional information about relationships between specific items.

In one embodiment, detailed information about each item may be obtained via the web site by accessing the item's detail page within the electronic catalog (see example item detail page shown in FIG. 3). Each item detail page may be located by, for example, conducting a search for the item via a search engine of the web site, or by selecting the item from a browse tree listing. Each item detail page may provide an option for the user to acquire the item from a retail entity and/or from another user of the system. The web server 32 may generate the item detail pages, and other pages of the web site, dynamically using a repository of web page templates 38.

As illustrated in FIG. 1, the web server system 30 maintains item acquisition histories 40 for each user of the web site. The item acquisition history 40 of each user identifies all of the catalog items purchased or otherwise acquired by that user via the web site, together with the associated dates of acquisition. Depending upon the nature and purpose of the web site, the item acquisition histories may, for example, be item purchase histories, item rental histories, item download histories, or a combination thereof. In some embodiments, the item acquisition histories 40 may include data obtained from external sources, such as the web site systems of business partners. Item acquisition histories 40 of many hundreds of thousands or millions of unique users may be maintained and analyzed by the system 30. Each user account may be treated as a separate user for purposes of maintaining item acquisition histories; thus for example, if members of a household share a single account, they may be treated as a single user.

As further illustrated in FIG. 1, a data mining component 44 periodically and collectively analyzes or "mines" the item acquisition histories of the users to generate a "sequential-acquisition pattern" table 46. Each entry (depicted as a row) of this table 46 identifies a pair of items that, based on a collective, computer-based analysis of the item acquisition histories 40 of users, tend to be acquired sequentially in the order indicated (i.e., first item followed by second item). For example, the first row of this table 46 indicates that a relatively large portion of the users who acquired item A thereafter acquired item D. This type of relationship may exist where, for example, the second item in the pair (i.e., the later-acquired item) is an accessory for, a replacement part for, or a sequel to, the first item in the pair.

In the example shown in FIG. 1, some of the table entries also include data indicating a characterizing time interval between acquisitions of the first and second items of the pair. For example, the first entry in the table 46 indicates that users who have acquired item D after acquiring item A have typically done so three to four months after acquiring item A. As illustrated by this example, the characterizing time intervals may optionally be in the form of bounded ranges, such as "3 to 4 months." As depicted by the second entry in the table 46, ranges that are unbounded at the upper end, such as 7+months (meaning "at least seven months"), may additionally or alternatively be used.

Figure 2A:
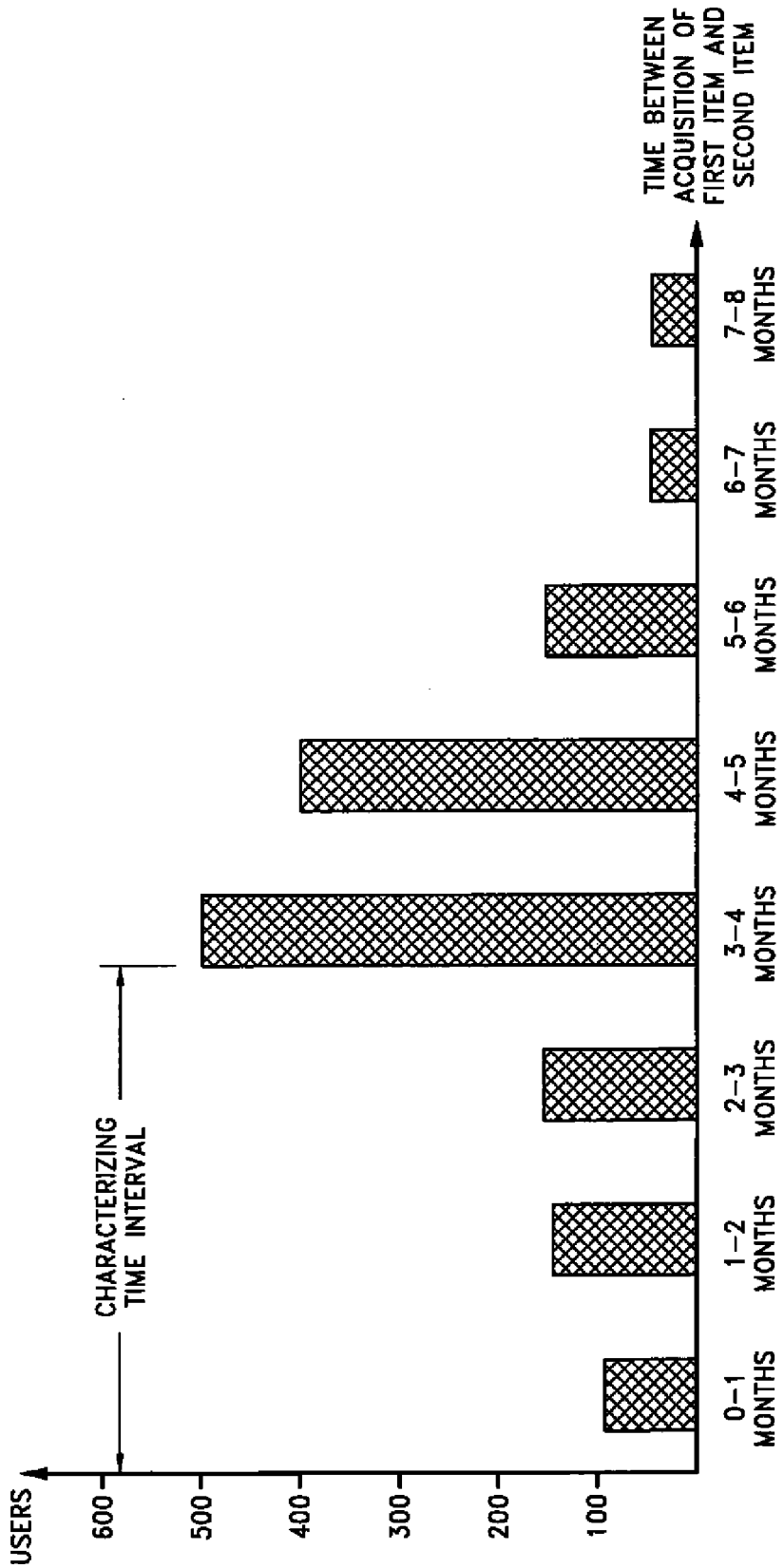
FIG. 2A illustrates an example dataset that reveals the existence of a characterizing time interval for a particular pair of items that tend to be acquired by users in a particular order.
Figure 2B:
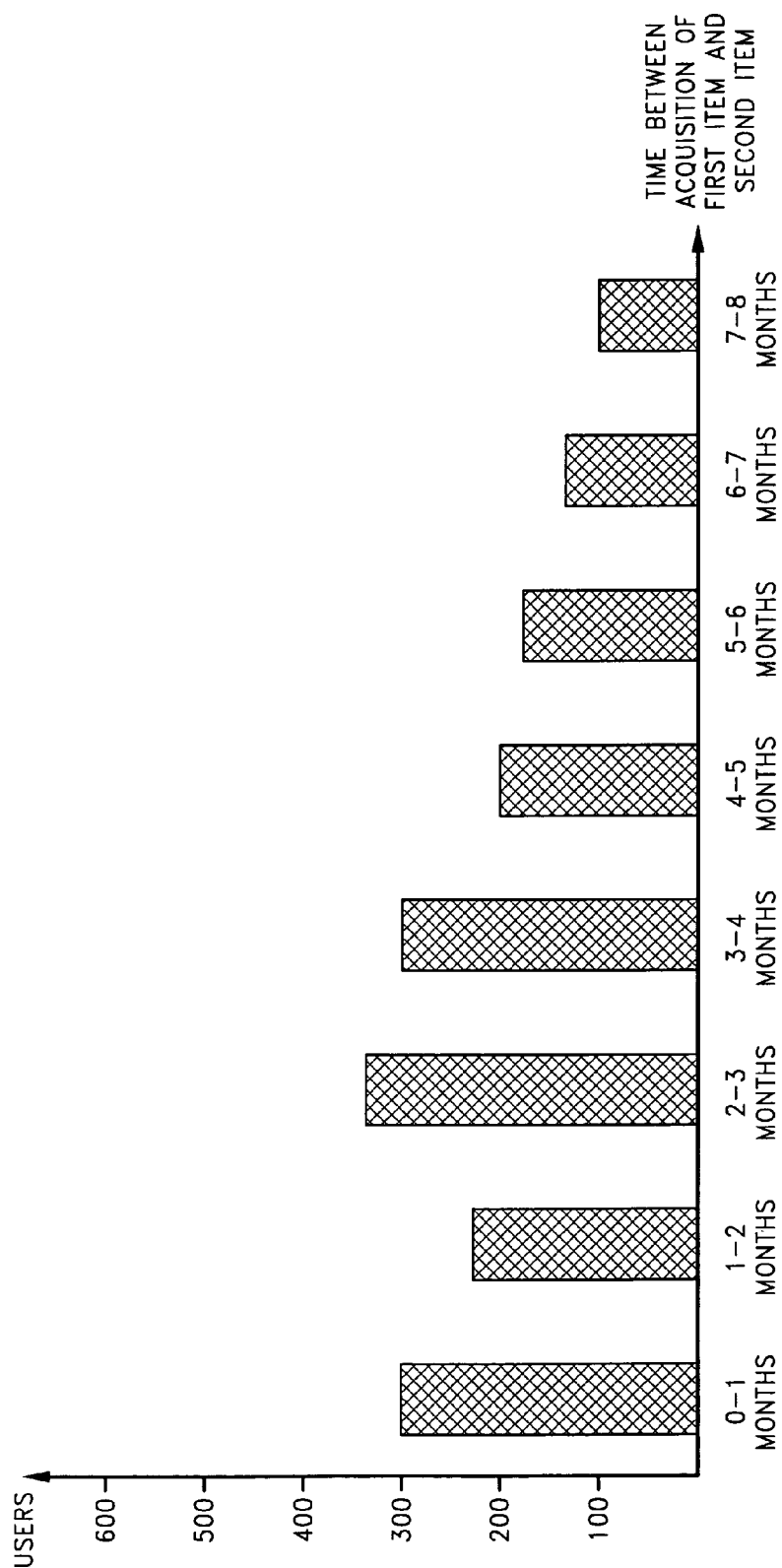
FIG. 2B illustrates an example dataset that does not reveal the existence of a characterizing time interval.

The characterizing time interval for a given pair of items may be determined by, for example, analyzing data sets of the type depicted in FIGS. 2A and 2B, each of which corresponds to a particular, hypothetical pair of items. Each such graph illustrates how long users typically wait before acquiring the second item in the pair once they have acquired the first item. The graph shown in FIG. 2A reveals a characterizing time interval of approximately three to four months because a statistically significant peak exists in the acquisition count (number of users) for this time interval bin. The graph shown in FIG. 2B, on the other hand, reveals a scenario in which a characterizing time interval does not clearly exists. For some item pairs, such as those in which the second item is ordinarily replaced each time it is consumed, multiple equally-spaced peaks may appear in the graph. In such scenarios, the peaks occurring after the initial peak may optionally be ignored (i.e., the characterizing time interval may be based solely on the initial purchase of the second item).

In one embodiment, table entries are created only for those item pairs for which a characterizing time interval is detected. To reduce the effect of product release dates, a given item pair may be excluded from the table 46 if the only characterizing time interval detected is approximately equal to the interval of time between the release of the first item and the release of the second item. The effects of product release dates may also be reduced by excluding from consideration item acquisition events that occurred shortly after (e.g., within one week of) the release of the corresponding item. Examples of algorithms that may be used to detect characterizing time intervals are discussed below.

The invention may, in some embodiments, be practiced without detecting characterizing time intervals. In addition, the characterizing time intervals may be detected and represented using methods other than those depicted in the drawings. For instance, although FIGS. 2A and 2B imply the use of binning of time intervals for purposes of the analysis, the characterizing time intervals may alternatively be detected without the use of binning. In addition, although FIG. 1 illustrates examples in which the characterizing time intervals are stored as ranges (e.g., "3 to 4 months" or "7+months"), the characterizing time intervals may additionally or alternatively be detected and stored in other forms, such as a single value (e.g. "25 weeks") representing, e.g., the average, minimum, or maximum amount of time users typically wait before acquiring the second item.

As further illustrated in FIG. 1, the sequential-acquisition pattern table 46 may also store "conditional probability" values for some or all of the pairs of items represented therein. These values generally reflect a frequency with which users who have acquired the first item have thereafter acquired the second item. Any of a variety of different methods may be used to calculate the conditional probability values. For example, where a characterizing time interval has been detected for a given pair of items, a conditional probability value may be calculated that corresponds to this characterizing time interval. Thus, for example, the first entry in the table 46 (FIG. 1) may indicate that 23% of the users who purchased item A purchased item D three to four months later; and the second entry may indicate that 78% of the users who purchased item A purchased item X seven or more months later.

Conditional probability values may additionally or alternatively be calculated without regard to characterizing time intervals. For example, the third table entry in FIG. 1, which does not include a characterizing time interval, may indicate that 33% of the users who purchased item B thereafter purchased item E. Two or more different types of conditional probability values may be calculated, and stored in the table 46, for a given pair of items (e.g. one value which is tied to a characterizing time interval, and one which is not). The invention may alternatively be practiced, in some embodiments, without the calculation or use of conditional probability data.

As illustrated in FIG. 1, the data mining component 44 may be configured in the illustrated embodiment by setting or adjusting a set of data mining parameters 50. One such parameter is a look-back period that specifies the time window of item acquisition events to be considered. For example, if a look-back period of three years is used, the table 46 will be generated by analyzing item acquisition events that occurred over the last three years from the current date. Different look-back periods may be used for different categories of items, and/or to detect different types of relationships. The other data mining parameters depicted in FIG. 1 are discussed below in connection with FIG. 4.

FIG. 3 illustrates some of the different ways the table data for an item can be incorporated into the item's detail page of the electronic catalog to assist users in making informed item selection decisions. In this example, the item featured on the page is the Canon i560 Desktop Photo Printer. In addition to providing functionality for users to select this item for purchase, the page includes the following: (a) a related items section 60 which lists items that are commonly purchased by users 3-5 months after purchasing the featured item, (b) a related items section 62 listing items that are commonly purchased six or more months after purchasing the featured item, and (c) a related items section 64 which lists items that are commonly purchased by users who have already purchased the featured item. Each item in these sections 60-64 is displayed as a hyperlink to the respective item's detail page in the electronic catalog.

Although three different related items sections 60-64 are shown for purposes of illustration, any one or more of the sections may be omitted, and any two or more may be combined. In addition, although the item relationship data is presented on an item detail page in this example, it can be conveyed to users via email messages, other types of catalog pages, or any other method.

In the example shown in FIG. 3, each item in the related items sections 60-64 is displayed together with a corresponding conditional probability value that indicates a measure of the frequency with which users who have purchased the featured item have thereafter purchased the respective related item. For example, the page indicates that 20% of the users who acquired the Canon i560 Desktop Photo Printer acquired a Canon BCI-6Y Yellow Ink Tank three to five months later. This data value (20%) assists viewers of the page in assessing the strength of the time-based relationship between the two items. The conditional probability values may also be helpful for selecting between items that are substitutes. For example, a user may use the data values provided in section 62 of the page to select between two alternative black ink tank products.

Although conditional probability values are illustrated in FIG. 3, they may alternatively be omitted, or may be presented in another form (e.g., graphically using charts, graphs, icons, or color coding). In addition, to further assist users in identifying relationships between specific items, charts of the type shown in FIGS. 2A and 2B may be exposed to users via the catalog.

Related items sections 60-64 of the type shown in FIG. 3 may be generated automatically using data read from the table 46. For example, to generate the related items sections 60-64 shown in FIG. 3, all table entries for which the Canon i560 is listed as the first item may initially be retrieved. These table entries may then be grouped such that those with a common characterizing time interval (or with no characterizing time interval) are grouped together. Finally, within each such group, the items may be ordered for display from highest to lowest conditional probability. The task of generating the related items sections 60-64 may be performed dynamically by the web server 32 in response to page requests from the user devices 34, such that updates to the table 46 are immediately reflected in newly generated web pages. Alternatively, the sections 60-64 may be incorporated into the semi-static content of the item detail pages until new table data becomes available.

Figures 4, 4A:
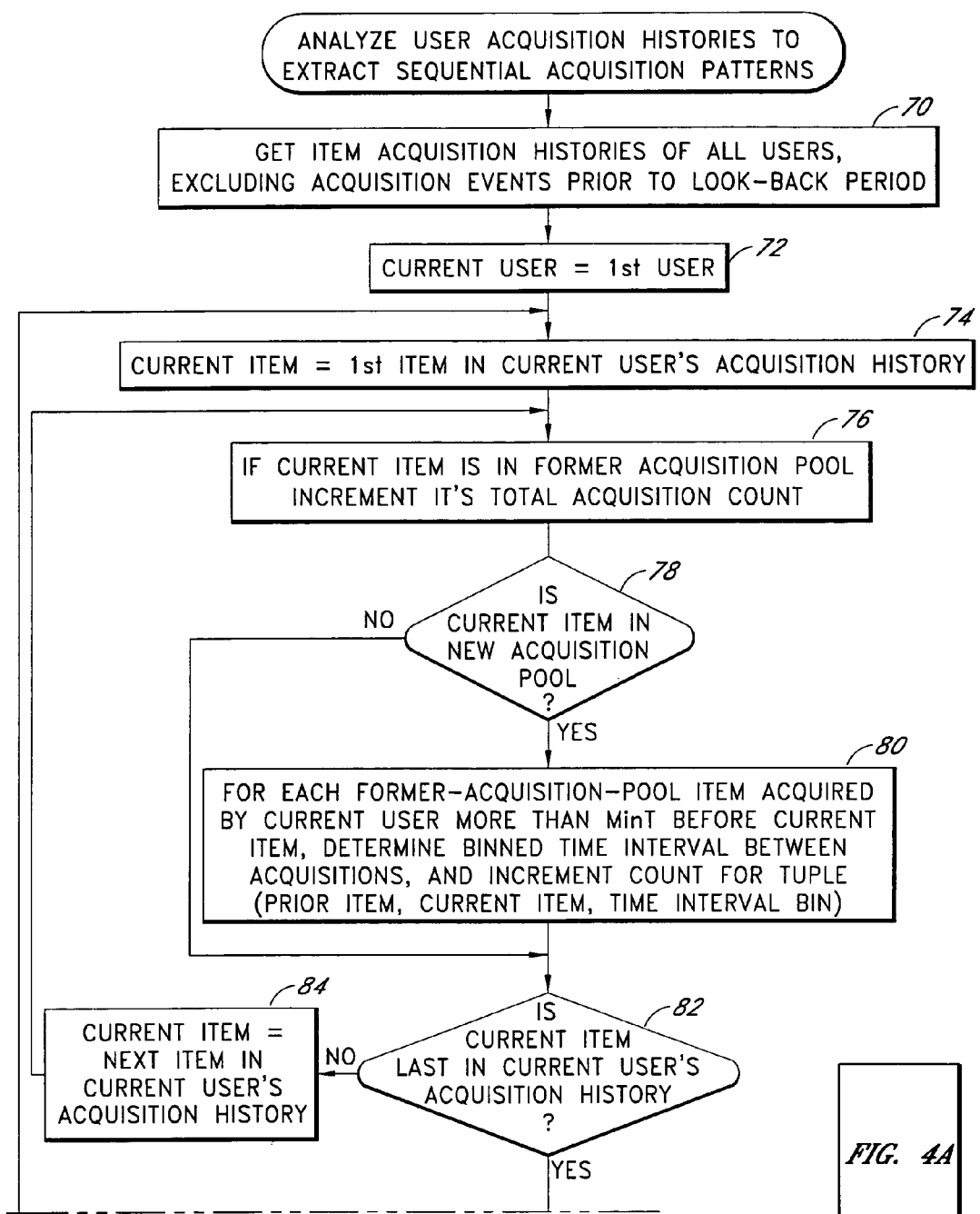
FIG. 4, which consists of FIGS. 4A and 4B, illustrates one example of a data mining method that may be used to generate a sequential-acquisition pattern table of the type shown in FIG. 1, and which may be used to identify item relationship data of the type shown in FIG. 3.
Figure 4B:
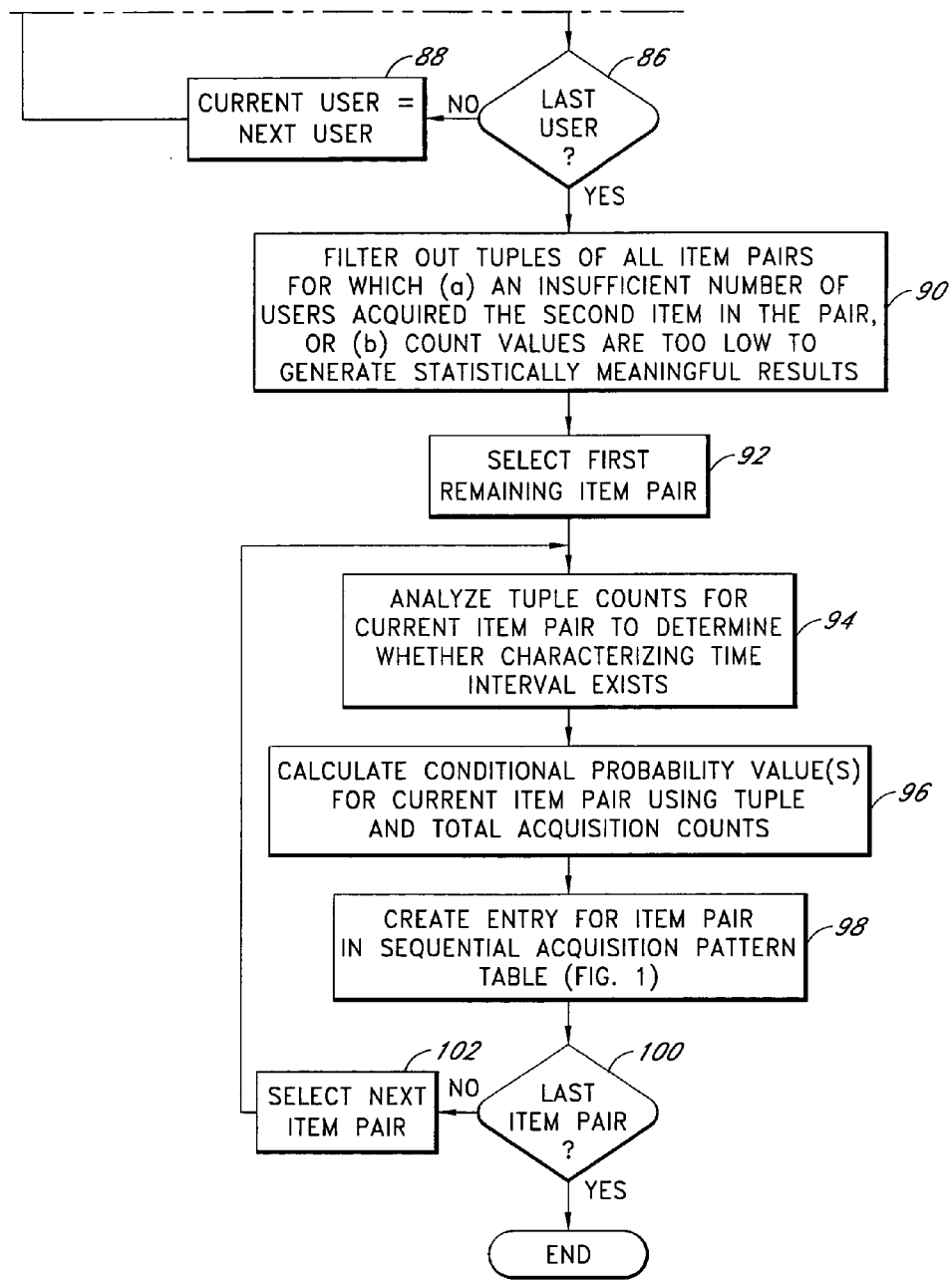

FIG. 4, which consists of FIGS. 4A and 4B, illustrates an example process (sequence of steps) that may be performed by the data mining component 44 of FIG. 1 to generate the table 46. This process may be repeated periodically (e.g., once a week) to update or regenerate the table 46 so that the table data reflects the most recent set of user activity data. Typically, the table 46 will be generated based on the purchase actions, or other acquisition actions, of many thousands, hundreds of thousands, or millions of users. For purposes of generating the table 46 and displaying item relationship data, different versions of a given product or work may be treated as the same item. Examples include hardcover and paperback versions of the same book title, video and DVD versions of the same movie title, CD and tape versions of the same music title, and different releases or editions of a particular product.

The process depicted in FIG. 4 makes use of a predefined "former acquisition pool" and a predefined "new acquisition pool." The former acquisition pool specifies the items that can serve as a "first item" in the table 46 of FIG. 1. The new acquisition pool specifies the items that can serve as a "second item" in the table 46. The pools may be defined so as to limit the types of relationships that are detected. For example, by using a former acquisition pool consisting of non-consumable items and a new acquisition pool consisting of consumable items, item relationships may be detected in which the second item is usually a replacement part for the first item. By allowing all types of items to appear in the former and new acquisition pools, a wider range of item relationships may be detected. The pool definitions and the look-back period may be selected in conjunction such that the pools consist of items that have been available throughout the entire look-back period.

In step 70 of FIG. 4, the item acquisition histories of all users of the system are retrieved, excluding any item acquisition events preceding the look-back period. Any appropriate look-back period may be used, such as six months, one year, three years, or infinity. In step 72, one of the users is selected as the "current user." In step 74, the first (least recently acquired) item in the retrieved item acquisition history of the current user is selected as the "current item."

In step 76, if the current item is in the former acquisition pool, its total acquisition count is incremented by one. At the end of the process of FIG. 4, each item in the former acquisition pool has a total acquisition count equal to the number of times that item was acquired during the look-back period. Multiple acquisitions of an item by a single user may optionally be treated as a single acquisition of the item, such that this count value represents the number of unique acquirers of the item. The total acquisition counts may be maintained in a temporary table of the type depicted in Table 1 below.

As depicted by blocks 78 and 80, if the current item is in the new acquisition pool, the process identifies the former-acquisition-pool items, if any, acquired by the current user more than MinT before acquiring the current item. The parameter MinT is a minimum time interval, such as one month or three months, that may optionally be used to exclude from consideration item purchase events that are close in time. For each former-acquisition-pool item identified in block 80, a count value is incremented for the corresponding tuple {prior item, current item, time interval bin}, where "time interval bin" is a range or bin of possible time durations between the two acquisition events. For example, if the current user acquired item 1 (a former-acquisition-pool item), and acquired item 2 (a new-acquisition-pool item) three months and ten days later, the tuple {item 1, item 2, 3-4 months} would be incremented, assuming time interval bins with a width of one month are used. The tuple counts may be maintained in a temporary tuples table (see Table 2 below, which shows tuple entries for a specific pair of items). If a particular tuple does not already exist in the temporary tuples table in step 80, it may be added.

As depicted by blocks 82-88, steps 76-80 are repeated for each additional item in the current user's acquisition history until the entire acquisition history is processed. The acquisition history of each additional user is then analyzed in the same manner until all of the retrieved item acquisition histories have been fully processed.

Tables 1 and 2 below illustrate example count values that may be generated for a given pair of items as the result of steps 76 and 80 of FIG. 4. Each row in Table 2 corresponds to a respective tuple, with each tuple corresponding to a respective time interval bin. In this example, the following parameters are used to define the time interval bins: MinT=0 (i.e., the first bin starts at time zero), BinW=3 months (i.e., bounded bins have a width of three months), and MaxT=15 months (i.e., the last bin, which is unbounded, begins at 15 months). These parameters may be adjusted to increase and decrease the granularity and scope of the analysis. Various other types of parameters may additionally or alternatively be used to control the data mining process.

TABLE 1

Total Acquisition Counts Table

| Item | Total Acquisition Count |
|---|---|
| Linksys BEFSR41 (Wired Router) | 7055 |
| Linksys WRT54G (Wireless-G Router) | 5145 |
| . | . |
| . | . |
| . | . |

TABLE 2

Tuple Counts Table

| First item | Second item | Time Interval Bin | Count |
|---|---|---|---|
| Linksys BEFSR41 | Linksys WRT54G | 0-3 months | 72 |
| Linksys BEFSR41 | Linksys WRT54G | 3-6 months | 325 |
| Linksys BEFSR41 | Linksys WRT54G | 6-9 months | 552 |
| Linksys BEFSR41 | Linksys WRT54G | 9-12 months | 884 |
| Linksys BEFSR41 | Linksys WRT54G | 12-15 months | 640 |

TABLE 2-continued

Tuple Counts Table

| First item | Second item | Time Interval Bin | Count |
|---|---|---|---|
| Linksys BEFSR41 | Linksys WRT54G | 15+ months | 1243 |
| . | . | . | . |
| . | . | . | . |
| . | . | . | . |

From the data maintained in these temporary tables, a variety of different conditional probability values can be calculated. For example, the table data reveals that, of those users who acquired a Linksys BEFSR41 Wired Router:
- 884/7055, or 13%, acquired the Linksys WRT54G Wireless-G Router nine to twelve months later;
- (884+640+1243)/7055, or 39%, acquired the Linksys Wireless-G Router nine or more months later; and
- (72+325+552+884+640+1243)/7055, or 53%, acquired the Linksys Wireless-G Router at some point after acquiring the wired router.

These values are referred to as "conditional probability" values, as they generally represent conditional probabilities that a user will acquire the second item if the user acquires the first item. Multiple different conditional probability values may be calculated, and stored in the table 46, for a given pair of items.

Table 2 in this example also reveals that users typically acquire the second item about 9-12 months after acquiring the first item. Thus, the count values in Table 2 may be used to identify a characterizing time interval.

Although not depicted by the above examples, the method used to calculate the conditional probability values may discount or disregard the most recent acquisitions of former-acquisition-pool items, since users who made these acquisitions may still acquire one or more new-acquisition-pool items within the relevant time periods. Thus, for example, the calculation 884/7055 above may be changed to 844/(7055−R), where R represents the number of users who have purchased the BEFSR41 Wired Router within the last nine months.

FIG. 4B illustrates additional steps that may be performed to build the sequential-acquisition pattern table 46 of FIG. 1 using the data stored in the two temporary tables. In block 90, the tuple counts table (Table 2) is filtered to remove all item pairs for which either (a) an insufficient number of the users who acquired the first item thereafter acquired the second item (e.g., less than 5%), or (b) the count values are too low to generate statistically reliable results. Thus, for example, if the item pair depicted in Table 2 did not meet these conditions, the six corresponding tuple entries (rows) of this table would be discarded. Typically, most of the tuples represented in the tuple counts table will be discarded as the result of this step 90. The tuple counts table may additionally or alternatively be filtered by using a randomization-test method to calculate probabilities that specific item pairs appear by chance, and by using the resulting probability values to select the item pairs to be retained. Specific examples of randomization tests that may be used are described separately below.

As depicted by blocks 92-98, the process then analyzes the table data of the remaining item pairs (those that have not been filtered out) to determine whether a characterizing time interval exists, and to calculate one or more conditional probability values for the item pair. The characterizing time intervals may be identified using a limit test that compares the count values for each of the time interval bins. For example, a given time interval bin, such as the bin 9-12 months in Table 2, may be treated as the characterizing time interval for the item pair if the count value for this bin/tuple both (a) represents at least 10% of the sum of the tuple count values for this item pair, and (b) is the highest tuple count value for any three-month bin for this item pair. Other types of algorithms, such as a randomization-test algorithm, may additionally or alternatively be used to detect and identify characterizing time intervals (see description below).

As depicted in block 98 of FIG. 4, the attributes extracted in steps 94 and 96 are used to create a corresponding entry in the sequential-acquisition pattern table 46 of FIG. 1. For instance, for the example data in Tables 1 and 2 above, the following entry may be created:

first item: Linksys BEFSR41
second item: Linksys WRT54G
characterizing time interval: 9-12 months
conditional probability for characterizing time interval: 13%
conditional probability for characterizing time interval and beyond: 39%
overall conditional probability: 53%

Referring again to FIG. 1, the data stored in the table 46 may additionally or alternatively be used by a "sequential pattern based recommendations" program module 35 to recommend specific catalog items to users based on the item acquisition histories of such users. For example, in connection with the first table entry in FIG. 1, item D may be recommended to a user that purchased item A three to four months ago and has not yet purchased item D. The recommendation may be made via an email communication, a personalized web page, or any other communication method, and may include a message explaining why the recommendation is being made. For example, a message of the following format may be transmitted to a purchaser of a Canon i560 approximately three months after the purchase date: "It has been three months since you purchased the Canon i560 Desktop photo printer. We thought you might like to know that users who have purchased this item have purchased the following items three to five months later: 20% bought the Canon BCI-6Y Yellow Ink Tank, 19% bought . . . ."

Figure 5:
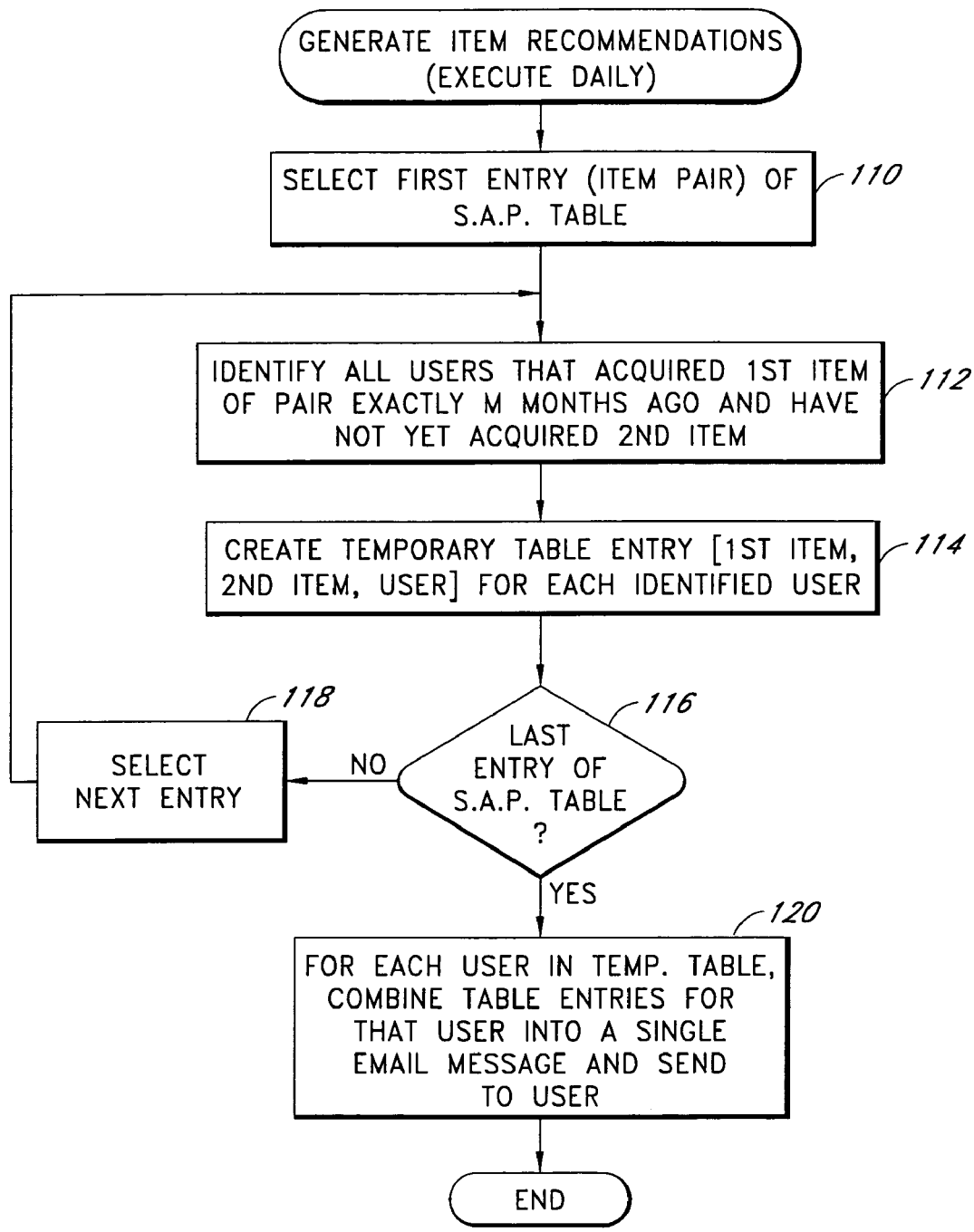
FIG. 5 illustrates one example of a method that may be used to generate item recommendations based on sequential pattern acquisition data mined from user activity data.

FIG. 5 illustrates an example of a process that may be embodied within the recommendations component 35, and executed on a daily basis, to provide such recommendations. It is assumed in this example that each entry in the table 46 specifies a characterizing time interval in terms of months, and that the recommendations are provided by email. In step 110, the first entry in the table 46 is selected as the current table entry. In step 112, the item acquisition histories of all users are checked to identify all users (if any) that both (a) acquired the first item in the current table entry exactly M months ago, where M is the lower bound of the corresponding characterizing time interval, and (b) have not yet acquired the second item in this entry. For each user identified in step 112, a respective entry is created in a temporary table in step 114 with the ID of the first item, the ID of the second item, and the ID of the user.

As depicted by blocks 116 and 118, steps 112 and 114 are then repeated for each additional entry in the sequential-acquisition pattern table 46. Finally, in step 120, the temporary table entries are aggregated by user ID so that each user receives only a single email message (which may include multiple recommendations, and may be based on more than one prior acquisition by the corresponding user), and the email messages are sent to the users. The results may alternatively be presented on a personalized web page the next time the user visits the web site.

Use of Randomization Tests to Evaluate Relationships

In addition or as an alternative to using limit tests, the data mining component 44 may use one or more different types of randomization tests to evaluate the strengths of the relationships between specific items. Consider the following statement: users who acquire item X are more likely to acquire item Y at time Z. To evaluate this statement, the following variables may be defined:

A is the set of all former acquisition pool items—those that can be plugged in for X;
B is the set of all new purchase pool items—those that can be plugged in for Y;
T is the set of time values, or time interval bins values, that can be plugged in for Z;
'a' is an element in A;
'b' is an element in B; and
't' is an element in T.

If we say that users have a propensity to acquire 'b' 't' units of time after acquiring 'a', we are saying that p('b'|'a', 't') is greater than p(X|Y, Z) for arbitrary values of X, Y and Z.

In one embodiment, the data mining component 44 uses the tuple counts table (the general format of which is shown above in Table 2) to test for the existence of two different types of relationships: (R1) whether users are more likely to acquire 'b' after acquiring 'a' in general; and (R2) whether users are more likely to acquire 'b' a specific time interval range after acquiring 'a'. Item pairs that do not exhibit at least one of these two types of relationships, R1 or R2, can be excluded from the sequential-acquisition pattern table 46. The type or types of relationships that exist for a given item pair may also be recorded in this table 46 and reflected on item detail pages.

In one embodiment, the data mining component 44 tests for the existence of relationships R1 and R2 using the Bootstrap method, which is a type of randomization test. The Bootstrap method is a well-known statistical analysis method that uses randomization to test the reliability of a set of data, or an inference drawn therefrom, and is described in "An Introduction to the Bootstrap" by Bradley Efron and Robert J. Tibshirani, published 1994 by Chapman & Hall/CRC (ISBN: 0412042312), the disclosure of which is hereby incorporated by reference. The following is one example of a Bootstrap procedure that may be used by the data mining component 44 to test for relationship R1:

1. Form a sample pool of items that appear in the second column of the tuple counts table (i.e., the column for "new acquisition pool" items). Include N units of each such item in the sample pool, where N is the total number of times that item was acquired as a second acquisition, as reflected in the tuple counts table. (Note that N may be determined for a given item by summing the count values of all rows in which that item appears in the second column.)
2. Select an item from column one of the tuple counts table (i.e., the column for "former acquisition pool" items), and for each time that item was acquired as a first acquisition, randomly select an item from the sample pool, with replacement. to form a new pair. At the end of this random assignment procedure, sum the number of occurrences for each pair of items to obtain a view of possible random association for that pair.
3. Repeat #2 many times (e.g. 500-5000 times) to generate a distribution for the association counts for random assignments.
4. Use this distribution to estimate a pvalue, the probability that a given association is purely due to chance.

For example, suppose the total count values reflected in the tuple counts table are as follows:

| a | b | Count |
|---|---|---|
| C | X | 100 |
| C | Y | 10 |
| C | Z | 5 |
| D | X | 6 |
| D | Y | 210 |
| D | Z | 50 |

In this simple example, the sample pool generated in step 1 would consist of 106 units of X, 220 units of Y, and 55 units of Z. In step 2 we would take each item that occurs in column 1 (namely C and D), and for each time that item was acquired as a first acquisition, randomly select an item from the sample pool, with replacement, to form an item pair (a, b). Thus, 100+10+5=115 item pairs of the form (C, ?) would be created, and 6+210+50=266 item pairs of the form (D, ?) would be created, where the question marks represent items selected, with replacement, from the sample pool. The results of this random assignment procedure may, for example, render the following resampling:

| a | b | Count |
|---|---|---|
| C | X | 33 |
| C | Y | 64 |
| C | Z | 18 |
| D | X | 71 |
| D | Y | 159 |
| D | Z | 36 |

This data set represents one snapshot of what random associations between these items might look like. By repeating this process many times (step 3 above), a distribution for the association counts can be obtained and used to estimate the pvalues (step 4).

Small pvalues indicate a high likelihood of a real effect rather than a random artifact. Accordingly, the data mining component 44 can use a pvalue threshold to determine whether relationship R1 exists for a given item pair. For example, a pvalue threshold of 5% may be used, corresponding to a 95% confidence level; or a threshold of 1% may be used, corresponding to a 99% confidence level. The result of this analysis tells us whether the pairing of 'a' and 'b' in the tuple counts table is due to random occurrence, or whether users actually have a propensity to acquire 'b' after 'a'.

To test for relationship R2, the data mining component 44 may use one or both of the following methods. The first method is to use a Chi Squared test against a uniform distribution across all separation values (column 3 of the tuples table). This method is less computationally intensive, but makes the potentially-erroneous assumption that the comparison distribution is uniform.

The second method to test for R2 is to gather all rows of the tuple counts table that correspond to particular values for columns 1 and 2, then sum all of the counts for column 4, then randomly assign values to column 4 from this sum. (Any rows that correspond to open-ended time interval bins may be ignored.) At the end of this random assignment, the sum of column 4 for all of the rows will be the same as the original sum, but with a different distribution. Again repeating this process and using the Bootstrap method, we can determine the likelihood that the original distribution was due only to chance.

For a given pair of items, the outcome of the tests for relationship R2, for different time interval values or bins, can be used to determine whether a characterizing time interval (or time interval bin) exists for that pair.

The various functional components described herein, including the data mining component 44, the web server 32, the item acquisition processing component 33, and the sequential pattern based recommendations component 35, may be implemented in software executed by one or more general purposes computers. The various data elements depicted in FIG. 1, including web page templates, the catalog item data, the item acquisition histories, the sequential-acquisition pattern table 46, and the data mining parameters, may be stored in one or more databases, and/or other types of data repositories, using any type or types of computer storage, including but not limited to hard disk drive storage, solid state volatile and non-volatile storage, and tape drives. The sequential-acquisition pattern table 46 may be implemented using any data structure, or combination structures, that can be used to look up the item relationship data associated with a given item.

Other features and components that may be included in the above-described web server system 30 are described in the following U.S. patent documents, the disclosures of which are hereby incorporated by reference: U.S. Pub. No. US 2002/0019763 A1, published Feb. 14, 2002, and U.S. patent application Ser. No. 10/864,288, filed Jun. 9, 2004.

As will be apparent, the features and attributes of the specific embodiments disclosed above may be combined in different ways to form additional embodiments, all of which fall within the scope of the present disclosure.

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is defined only by reference to the appended claims, which are to be construed without reference to any definitions that may be explicitly or implicitly set forth in the incorporated-by-reference materials.

What is claimed is:

1. A data mining method, comprising:
   maintaining, in computer storage, item acquisition histories of users of an electronic catalog of items, said item acquisition histories including information reflective of timings of item acquisition events;
   programmatically analyzing the item acquisition histories to identify a pair of catalog items, item A and item B, that have been acquired in the sequence item A followed by item B by each of a plurality of said users; and
   programmatically analyzing time intervals between user acquisitions of item A and item B among said plurality of users to identify a characterizing time interval, said characterizing time interval representing an amount of time users typically wait to acquire item B after acquiring item A.

2. The data mining method of claim 1, wherein programmatically analyzing time intervals comprises determining, for each of a plurality of time interval bins, how many of said plurality of users waited an interval of time, between acquiring items A and B, that falls within the respective time interval bin.

3. The data mining method of claim 2, further comprising analyzing count values associated with the time interval bins to determine whether one of the time interval bins is characterizing of the plurality of users.

4. The data mining method of claim 3, wherein the count values are analyzed, at least in-part, using a Bootstrap method.

5. The data mining method of claim 1, wherein the characterizing time interval is identified as a range of time intervals.

6. The data mining method of claim 1, wherein analyzing the time intervals comprises applying a randomization test to evaluate a likelihood that a potentially-characterizing time interval is the result of random user behavior.

7. The data mining method of claim 6, wherein applying a randomization test comprises using a Bootstrap method.

8. The data mining method of claim 1, further comprising using the characterizing time interval to select a timing with which to recommend item B to a user that has acquired item A.

9. The data mining method of claim 1, further comprising incorporating into the electronic catalog, in association with identifiers of item A and item B, a viewable representation of said characterizing time interval.

10. The data mining method of claim 9, further comprising calculating a data value reflective of a frequency with which users who have acquired item A have also acquired item B, and incorporating a viewable representation of the data value into the electronic catalog in association with the viewable representation of the characterizing time interval.

11. The data mining method of claim 1, further comprising calculating a data value reflective of a frequency with which users who have acquired item A have, after a period of time associated with the characterizing time interval, also acquired item B, and incorporating a visual representation of the data value into the electronic catalog in association with a catalog description of at least item A.

12. The data mining method of claim 11, wherein the data value is a percentage value, and is incorporated for display into an item detail page for item A together with an identifier of item B.

13. The data mining method of claim 1, wherein item A is non-consumable item and item B is a consumable item.

14. The data mining method of claim 13, wherein item B is a consumable accessory for item A.

15. A computer readable medium having stored thereon a computer program that, when executed by a computer system, causes the computer system to perform a data mining method that comprises:
maintaining, in computer storage, item acquisition histories of users of an electronic catalog of items, said item acquisition histories including information reflective of timings of item acquisition events;
programmatically analyzing the item acquisition histories to identify a pair of catalog items, item A and item B, that have been acquired in the sequence item A followed by item B by each of a plurality of said users; and
programmatically analyzing time intervals between user acquisitions of item A and item B among said plurality of users to identify a characterizing time interval, said characterizing time interval representing an amount of time users typically wait to acquire item B after acquiring item A.

16. A data mining method, comprising:
maintaining, in computer storage, item acquisition histories of users of an electronic catalog of items, said item acquisition histories including information reflective of timings of item acquisition events;
programmatically analyzing the item acquisition histories of said users (a) to identify a pair of catalog items, item A and item B, that have been acquired in the order item A followed by item B by each of a plurality of said users, and (b) to calculate, for a selected time interval range, a data value reflective of a frequency with which users who acquire item A wait for a time interval falling within said time interval range and then acquire item B; and
providing an indication of said data value in the electronic catalog, in association with identifiers of items A and B, to assist users in selecting items to acquire.

17. The data mining method of claim 16, wherein calculating the data value comprises dividing (a) a number of users whose acquisitions of items A and B are characterized by the time interval range, by (b) a total number of users that acquired item A.

18. The data mining method of claim 16, wherein the time interval range is bounded at a lower end by a non-zero time interval.

19. The data mining method of claim 18, wherein the non-zero time interval is at least three months.

20. The data mining method of claim 18, wherein the time interval range is unbounded at an upper end.

21. The data mining method of claim 18, wherein the time interval range is from X to Y, where X and Y are non-zero amounts of time.

22. The data mining method of claim 16, further comprising programmatically selecting the time interval range at least in part by identifying a characterizing time interval that represents an amount of time users typically wait to acquire item B after acquiring item A.

23. The data mining method of claim 16, wherein providing an indication of said data value in the electronic catalog comprises incorporating a message into a page of the electronic catalog, said message indicating that X % of the users who have purchased item A have purchased item B a designated amount of time later, where X represents the data value.

24. An electronic catalog system comprising one or more physical computers, said electronic catalog system operative to automatically perform a data mining method that comprises:
maintaining, in computer storage, item acquisition histories of users of an electronic catalog of items, said item acquisition histories including information reflective of timings of item acquisition events;
programmatically analyzing the item acquisition histories of said users (a) to identify a pair of catalog items, item A and item B, that have been acquired in the order item A followed by item B by each of a plurality of said users, and (b) to calculate, for a selected time interval range, a data value reflective of a frequency with which users who acquire item A wait for a time interval falling within said time interval range and then acquire item B; and
providing an indication of said data value in the electronic catalog, in association with identifiers of items A and B, to assist users in selecting items to acquire.

25. The electronic catalog system of claim 24, wherein the time interval range is bounded at a lower end by a non-zero time interval.

26. The electronic catalog system of claim 25, wherein the non-zero time interval is at least three months.

27. The electronic catalog system of claim 24, wherein the data mining method further comprises programmatically selecting the time interval range at least in part by identifying, from said item acquisition histories, a characterizing time interval that represents an amount of time users typically wait to acquire item B after acquiring item A.

28. The electronic catalog system of claim 24, wherein the electronic catalog system is operative to incorporate a message into a page of the electronic catalog for viewing by users, said message indicating that X % of the users who have purchased item A have purchased item B a designated amount of time later, where X represents the data value.

29. The computer-readable medium of claim 15, wherein the computer program is additionally capable of causing the computer system to calculate a data value reflective of a frequency with which users who have acquired item A have, after a period of time associated with the characterizing time interval, also acquired item B.

30. The computer-readable medium of claim 15, in combination with a program module that, when executed, uses the characterizing time interval to select a timing with which to recommend item B to a user who has acquired item A.

31. The computer-readable medium of claim 15, in combination with a server that causes a viewable representation of said characterizing time interval to be incorporated into a page of the electronic catalog, in association with identifiers of item A and item B, for viewing by users.

* * * * *